(12) United States Patent
Frank et al.

(10) Patent No.: US 9,148,035 B2
(45) Date of Patent: Sep. 29, 2015

(54) SUPERCONDUCTING ELECTRICAL MACHINE HAVING A CONNECTION DEVICE FOR AXIAL EXPANSION COMPENSATION OF A WINDING FORMER

(75) Inventors: Michael Frank, Uttenreuth (DE); Peter Van Hasselt, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 204 days.

(21) Appl. No.: 13/876,285

(22) PCT Filed: Sep. 27, 2011

(86) PCT No.: PCT/EP2011/066756
§ 371 (c)(1),
(2), (4) Date: Mar. 27, 2013

(87) PCT Pub. No.: WO2012/052261
PCT Pub. Date: Apr. 26, 2012

(65) Prior Publication Data
US 2013/0181552 A1 Jul. 18, 2013

(30) Foreign Application Priority Data
Sep. 28, 2010 (DE) .......................... 10 2010 041 534

(51) Int. Cl.
*H02K 55/04* (2006.01)
*H02K 3/46* (2006.01)
*H02K 1/28* (2006.01)

(52) U.S. Cl.
CPC .................. *H02K 3/46* (2013.01); *H02K 55/04* (2013.01); *Y02E 40/625* (2013.01)

(58) Field of Classification Search
CPC .......... H02K 1/28; H02K 7/003; H02K 55/04
USPC ..................... 310/52, 54, 61, 64, 65; 505/166
See application file for complete search history.

(56) References Cited

U.S. PATENT DOCUMENTS

| | | | |
|---|---|---|---|
| 2004/0017117 A1* | 1/2004 | Kwon et al. | 310/61 |
| 2004/0051419 A1* | 3/2004 | Frank et al. | 310/61 |
| 2004/0056541 A1* | 3/2004 | Steinmeyer | 310/52 |

(Continued)

FOREIGN PATENT DOCUMENTS

| | | |
|---|---|---|
| DE | 2 326 016 | 12/1973 |
| DE | 10063724 A1 | 7/2002 |

(Continued)

*Primary Examiner* — Michael Andrews
(74) *Attorney, Agent, or Firm* — Henry M. Feiereisen LLC.

(57) ABSTRACT

A superconducting electrical machine includes a rotor with a rotor outer housing surrounding a winding support having a superconducting winding. The rotor has on a torque-transmitting side a first, rigid connection device between the winding support and the rotor outer housing and on the opposite side a second connection device which compensates for axial expansion of the winding support. The second connection device has an axially extending connection element which is on one end connected rigidly to the winding support and which has on the opposite free end an axially moving, radially force-fitting connection to a centering holding element of the rotor outer housing. The holding element includes a bushing through the rotor outer housing, through which the free end of the connection element of the second connection device passes. The superconducting winding is cooled and thermally insulated.

17 Claims, 4 Drawing Sheets

(56) References Cited

U.S. PATENT DOCUMENTS

| | | | |
|---|---|---|---|
| 2007/0095075 A1* | 5/2007 | Frank | 310/52 |
| 2008/0110664 A1* | 5/2008 | Kwon et al. | 174/125.1 |
| 2013/0165325 A1* | 6/2013 | Frank et al. | 505/163 |

FOREIGN PATENT DOCUMENTS

| | | |
|---|---|---|
| JP | 4340361 A | 11/1992 |
| JP | 2002281734 A | 9/2002 |
| WO | WO 0250985 A1 | 6/2002 |

* cited by examiner

SUPERCONDUCTING ELECTRICAL MACHINE HAVING A CONNECTION DEVICE FOR AXIAL EXPANSION COMPENSATION OF A WINDING FORMER

CROSS-REFERENCES TO RELATED APPLICATIONS

This application is the U.S. National Stage of International Application No. PCT/EP2011/066756, filed Sep. 27, 2011, which designated the United States and has been published as International Publication No. WO 2012/052261 and which claims the priority of German Patent Application, Serial No. 10 2010 041 534.0, filed Sep. 28, 2010, pursuant to 35 U.S.C. 119(a)-(d).

BACKGROUND OF THE INVENTION

The present invention relates to a superconducting electrical machine having a rotor, which is mounted such that it can rotate about an axis of rotation and has a rotor outer housing, which is attached to axial rotor shaft parts and surrounds a winding former having at least one superconducting winding. Furthermore, the rotor has means for mounting the winding former within the rotor outer housing, and on a torque-transmitting side these means comprise a first, rigid connection device between the winding former and the rotor outer housing, and on the opposite side they comprise a second connection device which compensates for changes in axial expansion in the winding former. The second connection device has at least one axial connection element which at one end is connected rigidly to the winding former and whereof the opposite free end forms an axially moving, radially force-fitting connection to at least one centering mounting element of the rotor outer housing. Furthermore, means for cooling and thermally insulating the superconducting winding are provided. A corresponding superconducting electrical machine is known from DE 100 63 724 A1.

Electrical machines, in particular generators or motors, are typically composed of a rotor having a rotating excitation winding and a stator having a fixed stator winding. By using deep-cooled and in particular superconducting conductors, it is possible here to increase the current density and the specific power of the machine, that is, the ratio of power to mass in kilograms, and also to increase the efficiency of the machine.

Generally speaking, deep-cooled windings of electrical machines have to be thermally insulated from the surrounding area and kept at the required cool temperature by a cooling means. Here, effective thermal insulation can only be achieved if the deep-cooled parts of the machine are as far as possible separated from the warm area outside by a high vacuum having a residual gas pressure which is generally below $10^{-3}$ mbar, and if connection parts between these deep-cooled parts and the warm area outside transmit as little heat as possible.

Two variants are in particular known for the vacuum insulation of rotors having deep-cooled rotor windings and warm stator windings: in a first construction, the rotor has a warm outer housing and an enclosed vacuum space which rotates with it. In this case, the vacuum space is to surround the deep-cooled region on all sides. However, an undesired transmission of heat to the deep-cooled parts takes place by way of supports which extend through the vacuum space. In a second construction, the substantially cold rotor rotates in a high vacuum. In this case, the outer delimitation of the high vacuum space is defined by the inner bore of the stator. However, an arrangement of this kind requires shaft seals which provide a seal against high vacuum, between the rotor and the stator.

In the first construction mentioned above, which is known for example from DE 23 26 016 B2, the superconducting winding of the rotor is located inside a rotor cryostat which, by means of flanged shafts mounted thereon, forms an outer housing of the rotor. Using conventional superconductor material for the conductors of the winding, helium cooling is provided, giving an operating temperature of approximately 4 K. In addition to the metal superconductor materials which have long been known such as NbTi or $Nb_3Sn$, since 1987 metal oxide superconductor materials with transition temperatures above 77 K have also been known. With conductors using high-$T_c$ superconductor materials of this kind, which are also called HTS materials, it is possible to manufacture superconducting windings of machines that are to be cooled, using liquid nitrogen, to an operating temperature below approximately 77 K. By contrast, the external contour of the rotor outer housing is at approximately room temperature, and in operation may in some cases even be above this.

The net torque of the machine is generated in the rotor winding. The latter is arranged in a cold winding former which, for its part, is suspended or mounted insulated in the rotor outer housing, which acts as a cryostat. In this arrangement, this suspension or mounting on the drive side of the rotor must be stable enough to transmit the torque from the cold winding former to a drive-side shaft part. For this reason, a corresponding, rigid connection device for transmitting torque has to be of relatively solid construction and be connected with force fit to the winding former and the drive-side shaft part. At the same time, this connection device is responsible for centering the cold winding former on the drive side. On the opposite side of the rotor, which is also called the non-drive or operating side because this is where the connections important for operation of the machine such as the supply of cooling means are provided, virtually no torque is taken off. For this reason, substantially only the functions of centering and thermal insulation have to be fulfilled here. However, because when there is a transition from room temperature to operating temperature the axial length of the winding former in relation to the corresponding expansion of the rotor outer housing is reduced by at least one millimeter, the suspension on the operating side must additionally provide the function of a corresponding compensation in length. For this reason, in the prior art disc-shaped connection elements which run radially between the rotor outer housing and the winding former and which enable a corresponding deflection in the axial direction, to compensate for expansion, are provided. As an alternative, it is possible to provide, inside a rotor cryostat, sliding seats which make possible or compensate for axial expansion of the winding former.

A disadvantage of sliding seats inside a rotor cryostat is that the sliding seat is located in the insulating vacuum of the rotor and so the sliding seat cannot be lubricated with lubricants such as oils or greases. As a result of micromovements, for example, on each rotation of the rotor in the machine, the sliding seat of the machine is subject to considerable wear during long-term operation. When the machine is started up, because the rotor cryostat lacks optical transparency, it is moreover not possible to observe the process of shrinkage in the winding former as it cools to a cryogenic temperature. Thus, accurate knowledge of the parameters of the materials and a layout of the sliding seat with sufficient additional play are required to ensure reliable axial mounting of the winding former even at low, cryogenic temperatures. A more spacious layout of the sliding seat and the associated occupation of space result in greater material consumption, higher costs, poorer properties of the machine in operation, and the need for more space for cooling. There is thus less advantage in a more compact construction by comparison with conventional, non-superconducting machines.

SUMMARY OF THE INVENTION

It is an object of the present invention to specify a superconducting electrical machine which has a suitable connection device and which enables compensation for axial expansion in a relatively simple, inexpensive and compact manner and in so doing reduces in particular losses through heat introduced into the superconducting winding by way of the connection device. It is a further object of the present invention to specify a superconducting electrical machine having a connection device which enables indirect visual monitoring or observation, from outside the rotor, of the shrinkage in the winding former during cooling.

The superconducting electrical machine according to the invention comprises a rotor, which is mounted such that it can rotate about an axis of rotation and has a) a rotor outer housing, which is attached to axial rotor shaft parts and surrounds a winding former having at least one superconducting winding, and b) means for mounting the winding former within the rotor outer housing, and on a torque-transmitting side these means comprise a first, rigid connection device between the winding former and the rotor outer housing, and on the opposite side they comprise a second connection device which compensates for changes in axial expansion in the winding former and which has at least one axial connection element which at one end is connected rigidly to the winding former and whereof the opposite free end forms an axially movable, radially force-fitting connection to at least one centering mounting element of the rotor outer housing, wherein the mounting element of the rotor outer housing comprises at least one feedthrough in the rotor outer housing, through which the free end of the connection element of the second connection device is guided. The superconducting electrical machine according to the invention further comprises c) means for cooling and thermally insulating the superconducting winding.

As a result of the free end of the connection element, which is guided through the feedthrough in the rotor outer housing, it is possible to monitor or observe indirectly, from the outside, the spatial change or shrinkage in the winding former as it cools, outside the rotor outer housing. The second connection device of the superconducting electrical machine, having the connection elements which are guided through the feedthrough in the rotor outer housing, makes it possible to compensate for axial expansion during cooling and spatial contraction of the winding former, and from a construction point of view is relatively simple and inexpensive, making a compact structure of the machine possible. The construction limits losses through heat introduced into the superconducting winding by way of the connection device.

The axial connection element may include an insulating tube, in the form of a hollow cylinder, and guide pins, wherein in particular at least three guide pins are each attached by means of one of their longitudinal sides directly and mechanically to the insulating tube and the opposite side takes the form of a free end. The guide pins are guided through the feedthroughs in the rotor outer housing. The use of guide pins results in a simple and inexpensive construction and little transport of heat into the rotor outer housing toward the winding former.

The guide pins may extend axially and have a free end which in each case projects into a feedthrough in the rotor outer housing by sliding without play. This results in an unhindered compensation of expansion when the winding former cools and contracts spatially. In this context, the term sliding without play is understood to mean that any friction forces have virtually no hindering effect on axial displacement of the end of the connection element in the feedthrough, despite any radial force fit between these components. Because of the length of the guide pins, which may project outward out of the feedthroughs, the extent of contraction of the winding former on cooling, or its expansion on heating, may be observed.

The guide pins may be provided with a support ring at their free ends. This support ring may result in the clearance between the free ends being fixed in space, and thus prevent the guide pins from becoming skewed in the feedthroughs.

The mounting element of the rotor outer housing may comprise at least one bearing device for guide pins, in particular in each case a bearing device which is attached to the external surface of the rotor outer housing in the region of a feedthrough in the rotor outer housing and through which the free end of a guide pin is guided. This bearing device may also prevent the guide pins from becoming skewed in the feedthroughs and make lubrication in the feedthroughs unnecessary, even for frictionless or low-friction sliding.

The bearing device may have a vacuum barrier in the region of the feedthrough in the rotor outer housing. This may be connected to the guide pin in vacuum-tight manner and cover the feedthrough in the rotor housing in vacuum-tight manner. The vacuum barrier may include a CF flange which has a membrane and is arranged in particular between the bearing device and the rotor outer housing. The vacuum barrier makes it possible, inside the rotor housing, to maintain a vacuum for thermal insulation of the inside from the outside of the rotor housing, despite the feedthroughs. Here, a membrane is flexible in respect of movement of the guide pins and is inexpensive to produce.

The guide pins may take the form of bolts or rods. In this connection, in particular cylindrical or cuboid-shaped cross sections are possible. Bolt-shaped or rod-shaped guide pins are simple to manufacture and mechanically stable. They may be made from steel, copper, Teflon or fiber-reinforced plastic material, or may include these materials.

At least three feedthroughs that pass completely through the rotor outer housing may be provided. Here, the feedthroughs may in particular be arranged on a circle periphery having a center point at which a flange shaft is connected with force fit to the rotor outer housing. It is favorable for feedthroughs to be distributed evenly on the circle periphery, that is to say to have the same clearance from one another. As a result of using three or more feedthroughs on a circle periphery, with a corresponding guide pin associated with each feedthrough or arranged in the feedthrough, a very stable arrangement is produced. Even with high centripetal forces at high rotational speeds of the rotor, the guide pins are able, interacting with the feedthroughs and rotor housing, to keep the rotor and its winding former securely on an axis of rotation. The feedthroughs passing completely through the rotor outer housing also allow observation or monitoring of the guide pins and hence the spatial contraction or expansion of the winding former from outside the rotor outer housing, in particular during cooling or heating from or to an operating temperature.

The connection element may include steel, copper, Teflon or fiber-reinforced plastic material and/or may be made entirely therefrom. Metals and fiber-reinforced plastic are very stable mechanically, even at low temperatures, are relatively inexpensive and are dimensionally stable in the long term. Teflon may for example also be used as a lubricant layer. As an alternative, it is also possible to lubricate using conventional greases or oils to give almost frictionless sliding of the guide pins in the feedthroughs.

The conductors of the superconducting winding may contain metal low-$T_c$ superconducting material or metal oxide high-$T_c$ superconducting material. The choice depends on the requirements made of the machine, the manufacturing costs budgeted for, and the anticipated cooling, for example with helium or nitrogen.

A vacuum space is present at least between the rotor outer housing and the winding former. The result of this is that good thermal insulation is achieved and effective cooling or operation of the machine is possible without high losses of heat through the rotor outer housing. If guide pins made from fiber-reinforced plastic are used, then by comparison with metal ones the introduction of heat by way of the guide pins into the winding former from outside the rotor outer housing is also reduced.

The construction described above for the superconducting electrical machine offers the advantages of the possibility of simple, cheap manufacture, good centering and at the same time the possibility of achieving low heat loss. Here, a compensation of shrinkage (=axial movement) is permitted as a result of a genuine relative movement of the two suspension or mounting components, namely the connection element and the feedthrough through the rotor outer housing. The centering and rigidity of the connection device are, however, still retained. Here, there is no need for a special pairing of materials for the compensation of shrinkage.

BRIEF DESCRIPTION OF THE DRAWING

Preferred embodiments of the invention with advantageous developments according to the features of the dependent claims are explained in more detail below with reference to the figures but without being restricted thereto. In the figures, like parts are provided with like reference numerals.

In the figures.

DETAILED DESCRIPTION OF PREFERRED EMBODIMENTS

Figure 1:
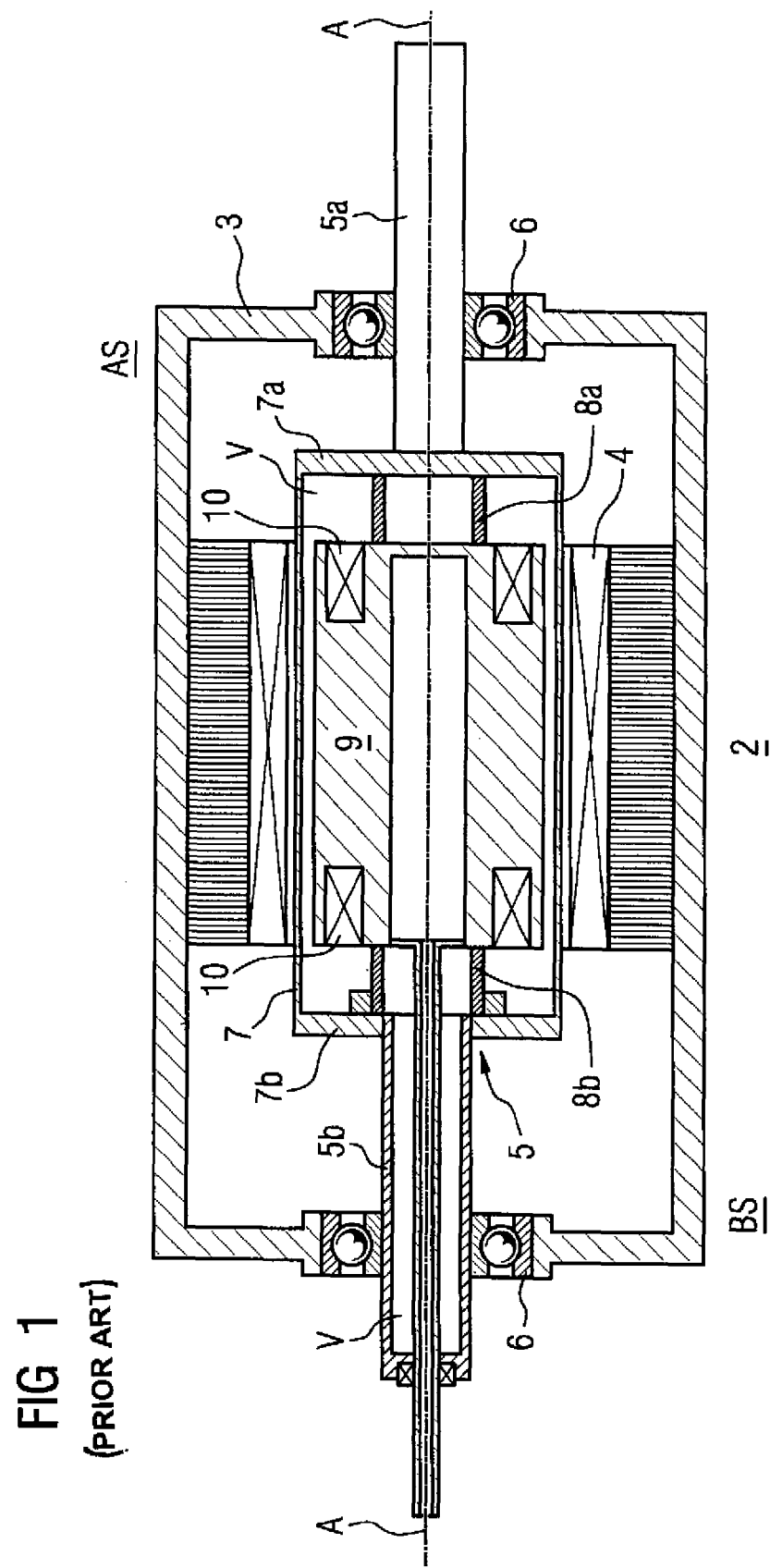
FIG. 1 shows a diagrammatic longitudinal section through a superconducting electrical machine 2 according to the prior art.

FIG. 1 illustrates a superconducting electrical machine 2 which is used for example as a generator or motor, shown as a diagrammatic longitudinal section according to the prior art. The superconducting electrical machine 2 includes a rotating superconductive winding 10 with for example metal LTS material (low-$T_c$ superconducting material) or oxide HTS material (high-$T_c$ superconducting material). It should be assumed that the latter material is used in the exemplary embodiments below. The winding may comprise a coil or a system of coils in a two-pole, four-pole or other multipolar arrangement.

The superconducting electrical machine which is generally designated 2 includes a fixed machine outer housing 3 which is at room temperature and has a stator winding 4 therein. Inside this outer housing, which may be operated under vacuum, and surrounded by the stator winding 4, a rotor 5 is borne in bearings 6, such that it is rotatable about an axis of rotation A, and includes on its so-called drive side AS a solid axial rotor shaft part 5a which is borne in the corresponding bearing. The rotor has a rotor outer housing 7 which takes the form of a vacuum vessel in which a winding former 9 having an HTS winding 10 is mounted. For this there serves, on the drive side AS, a rigid, tubular connection device 8a between the winding former 9 and a disc-shaped side part 7a of the rotor outer housing 7 that is fixedly connected to the rotor shaft part 5a. The transmission of torque is also by way of the first, rigid connection device 8a. Advantageously, this connection device substantially comprises a hollow cylinder which is a poor thermal conductor, in particular made from a plastic material which is reinforced for example with glass fibers (so-called fiberglass) or with other fibers. This material ensures sufficient mechanical rigidity for the transmission of torque and a high modulus of shear (G modulus) at the same time as low thermal conductivity. On the non-drive side or operating side, that is opposite the drive side AS, which is designated below as BS, a second connection device 8b is arranged between the winding former 9 and a disc-shaped side part 7b of the rotor outer housing 7.

Further indicated in FIG. 1, on the side BS remote from the drive, is a hollow cylindrical shaft part 5b which is rigidly connected on its side facing the rotor outer housing 7 to the disc-shaped side part 7b thereof. Among other things, a cooling means for cooling the superconducting winding 10 is supplied from outside the machine by way of this shaft part, which is mounted in a bearing 6. Details of the cooling means supply and the sealing are known from the prior art. For this reason, a detailed illustration thereof has not been included in the figure. A vacuum, which surrounds the winding former 9 having the superconducting winding 10, is designated V. The vacuum is in particular present between the warm rotor outer housing 7 and the winding former 9.

For reasons of thermal insulation, fiberglass in radial and/or in particular axial parts is the primary material to be considered for centered suspension of the winding former 9, including on the rotor side BS, which transmits virtually no torque. A particular embodiment of a corresponding connection device 8b is apparent from FIG. 2. This connection device has as the connection element 12a fiberglass tube which is glued in place at one end for example in a flange 13. This flange is rigidly and thermally conductively connected to a cold part of the winding former 9; for example it is screwed thereto. However, the flange may also be part of the winding former itself or be connected to other parts of the winding former. The opposing free end 12a of the fiberglass tube 12 is advantageously grasped by a hardened support ring 15. This ring, which is made in particular from metal such as hardened steel, may slide without play in the opening 20 in a mounting element 18 that surrounds it. In this context, the term sliding without play is understood to mean that any friction forces have virtually no hindering effect on axial displacement of the end 12a of the connection element 12, or the support ring 15 thereof, in the corresponding opening 20 in the mounting element 18. At the same time, however, a radial force fit is to be maintained between the support ring and the mounting element. For this reason, the mounting element 18 is advantageously made from the same material as the support ring. This substantially annular mounting element is embedded in a warm flange 19 or is connected thereto or is part thereof. This flange 19 is part of the side part 7b of the rotor outer housing 7 or the shaft part 5b.

To improve the capacity for mutual sliding of the support ring 15 and the mounting element 18 in the axial direction, one of these components, for example the mounting element 18, is advantageously provided on the inside of the opening 20 with radially extending lug-like prolongations 17i which are arranged regularly in the peripheral direction and against which the support ring 15 abuts with form fit and force fit. As a result the contact face between the two parts, and hence the friction force on the region of the lugs, is reduced without eliminating the interference fit (press fit) required for the radial force fit.

According to a corresponding concrete exemplary embodiment, the diameter of the fiberglass tube 12 is for example 90 mm, with a wall thickness of 2 mm. The free tube length is for example 40 mm. The precision of manufacture allows the run-out of the individual parts in relation to each other to be determined. The support ring 15 made from hardened steel and having an external diameter of 100 mm fits into the radially inwardly pointing guide lugs 17i of the mounting element 18 made from hardened steel such that on the one hand there is no play but on the other hand axial displacement of the ring in the socket created by a lug can be guaranteed under the forces that arise. For this purpose, the mounting element 18 has a substantially hollow cylindrical shape, having an external diameter of 133 mm and an axial extent of 25.5 mm. Its wall thickness is 7.5 mm, with the exception of the region of its guide lugs 17i, of which there are for example six. In the region of the lugs, the internal diameter of the mounting element is reduced to around 100 mm. This enables a compensation of axial length when the former element 9 cools down and heats up. Moreover, associated with this embodiment is the additional fact that manufacturing tolerances in the axial direction can be compensated for to a certain extent.

In the concrete exemplary embodiment, the connection device 8b represents a heat loss of approximately 2.5 W, and so it also sufficiently fulfills the function of thermal insulation.

Because of the arrangement in the vacuum V, lubrication of the connection device 8b with oils or lubricating grease or creams is not possible. Another problem is the moderate size of the layout of the connection device 8b, since on the one hand it must have sufficient play for it to be possible to compensate for the entire change in length of the winding former 9 as it cools down or heats up. On the other hand, a compact construction with as little material to cool as possible necessitates a connection device 8b that is as small as possible. Thus, a layout of the connection device 8b of moderate dimensions necessitates precise knowledge of the materials, which is typically difficult. Observation from the outside of the change in length in the winding former 9 as it cools down or heats up is not possible, because of the enclosed construction of the rotor outer housing 7.

Figure 3:
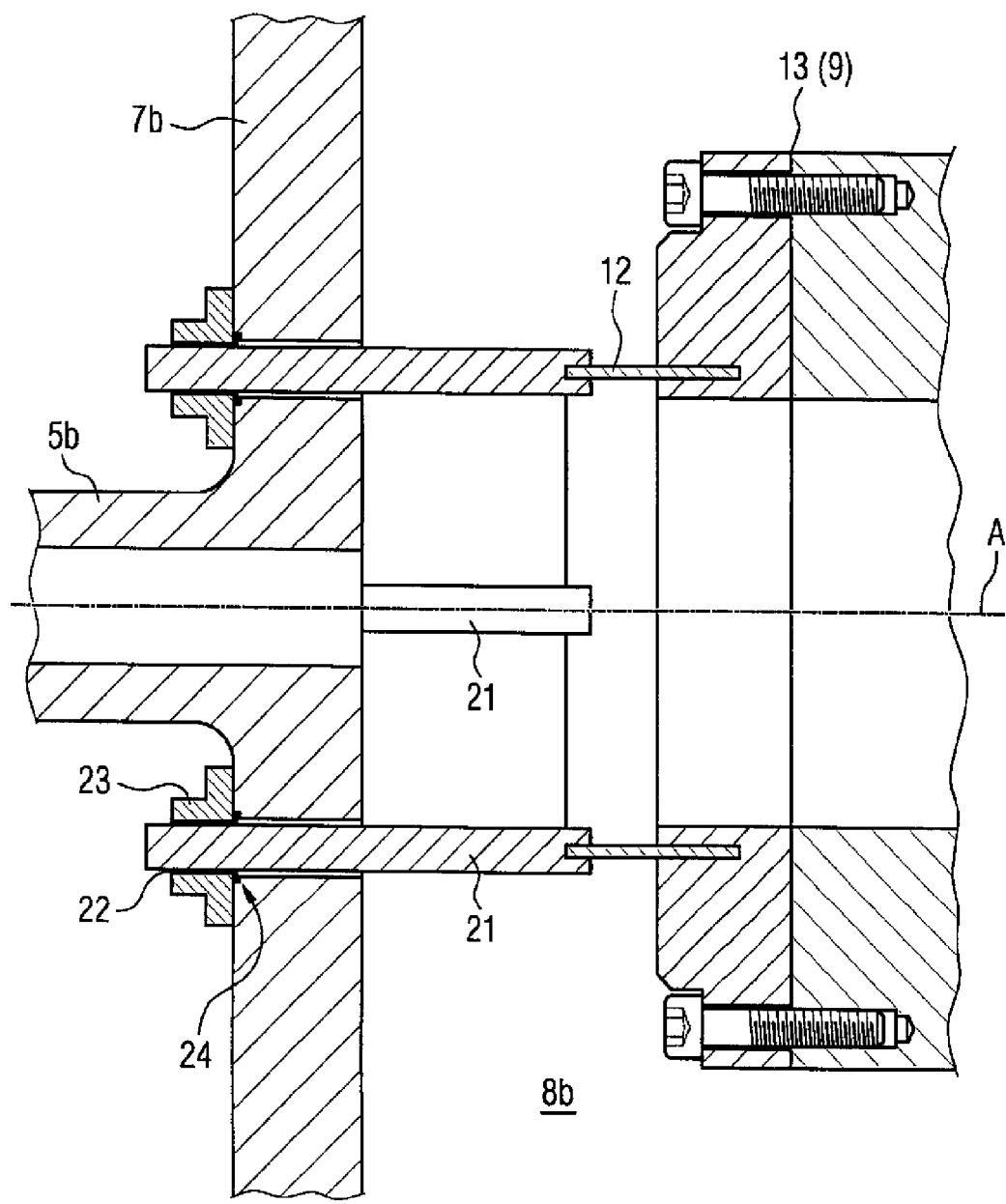
FIG. 3 shows a detail from a machine 2 having connection elements between the winding former 9 and the mounting elements of the rotor outer housing 7 according to the invention, having feedthroughs 22 in the rotor outer housing 7 through which the connection elements are guided.

FIG. 3 illustrates a connection device 8b according to the invention which both enables observation of the change in length in the winding former 9 from outside the rotor housing 7, and also makes it possible to lubricate the connection device with oils or lubricating grease or creams.

Figure 2:
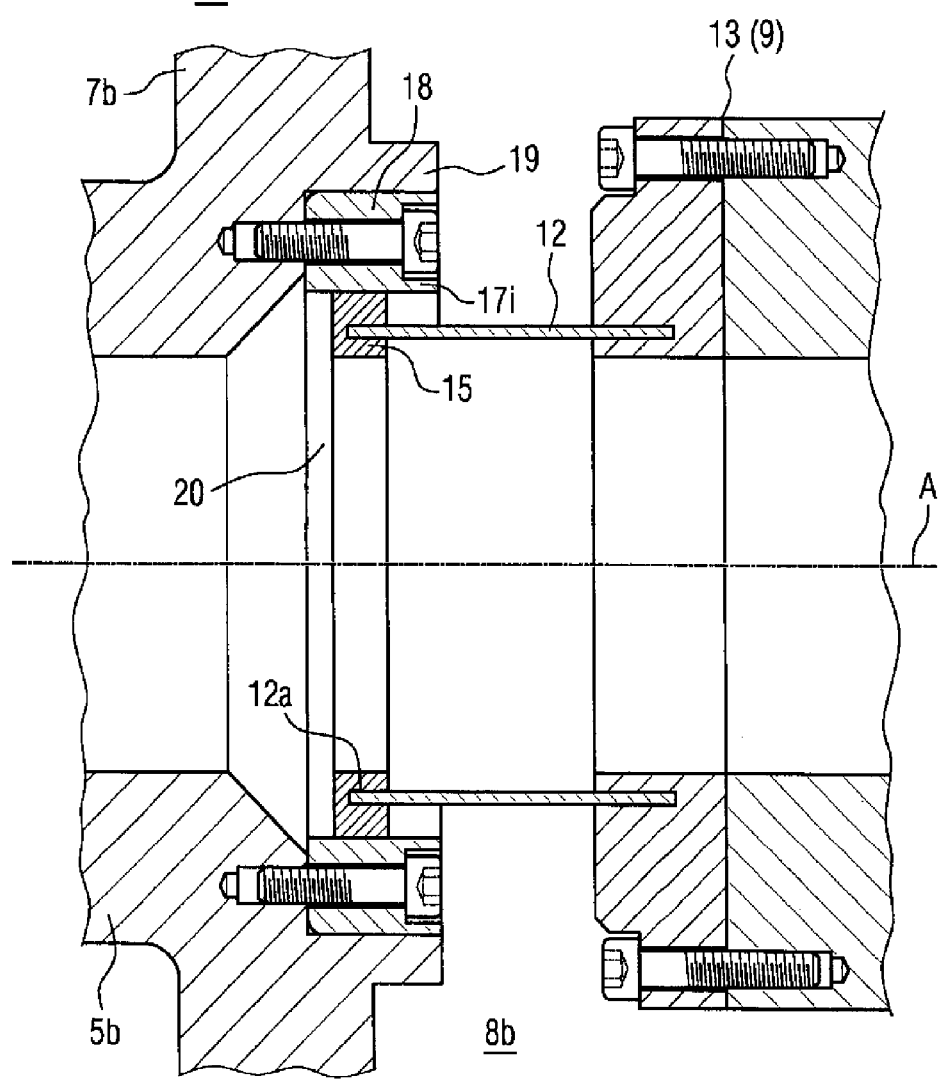
FIG. 2 shows a detail from the machine 2 shown in FIG. 1, having a connection element between the winding former 9 and a mounting element of the rotor outer housing 7, arranged completely within the rotor outer housing 7, according to the prior art.

The superconducting electrical machine 2 according to the invention has all the features of the superconducting electrical machine 2 as illustrated in FIGS. 1 and 2, with the exception of the construction of the connection device 8b, described below. Similarly to the connection element 12 shown in FIG. 2, the connection element 12 of the superconducting electrical machine 2 according to the invention as illustrated in FIG. 3 is mechanically connected to the winding former 9. A tubular connection element 12 may be attached to the winding former 9, for example by way of a flange 13. Guide pins 21 are attached to the tubular connection element 12 at its free end, which is the opposite end of the connection element 12 to that mechanically connected to the flange 13. As an alternative, the guide pins 21 may also be mechanically attached directly to the flange 13 or the winding former 9, which for the sake of simplicity is not illustrated in the figures. The guide pins 21 are arranged distributed regularly in relation to one another on a notional cylinder external surface, with their longitudinal axis parallel to a longitudinal axis of the notional cylinder external surface. The notional cylinder external surface may for example represent an extension of the tubular connection element 12. There may for example be three guide pins 21 arranged offset by 120° in the peripheral direction in relation to one another. The guide pins 21 may for example take a bolt-shaped or rod-shaped form. Cylindrical guide pins 21 are advantageous.

At the end opposite that at which the guide pins 21 are attached for example to the tubular connection element 12, the guide pins 21 have a free end. By means of the free end, the guide pins 21 each project into or through feedthroughs 22 from the inside of the rotor outer housing 7 to the outside, in particular through a rotor outer housing part 7b. As described in FIGS. 1 and 2 above, the rotor outer housing part 7b is connected to the tubular rotor shaft part 5b, by way of which a connection is made directly or indirectly with a supply of cooling means for cooling the superconducting winding 10 from outside the machine 2, which for the sake of simplicity is not illustrated.

The feedthroughs 22 have a slightly larger diameter than the external diameter of the guide pins 21, for example having a difference in diameter in the region of one millimeter, and have the same cross-sectional shape as the guide pins 21. In the exemplary embodiment described, the feedthroughs 22 are arranged, distributed regularly in relation to one another, for example on a notional cylinder external surface which is the same as the notional cylinder external surface of the guide pins 21, with their longitudinal axis parallel to a longitudinal axis of the notional cylinder external surface. In this case, there may for example be three feedthroughs 22 arranged in the housing side part 7b, offset by 120° in the peripheral direction in relation to one another, with the longitudinal axis of the notional cylinder external surface being the same as the axis of rotation A.

As a result of the slightly larger diameter of the feedthroughs 22 by comparison with the external diameter of the guide pins 21, the guide pins 21 may slide in the feedthroughs 22 without play.

Figure 4:
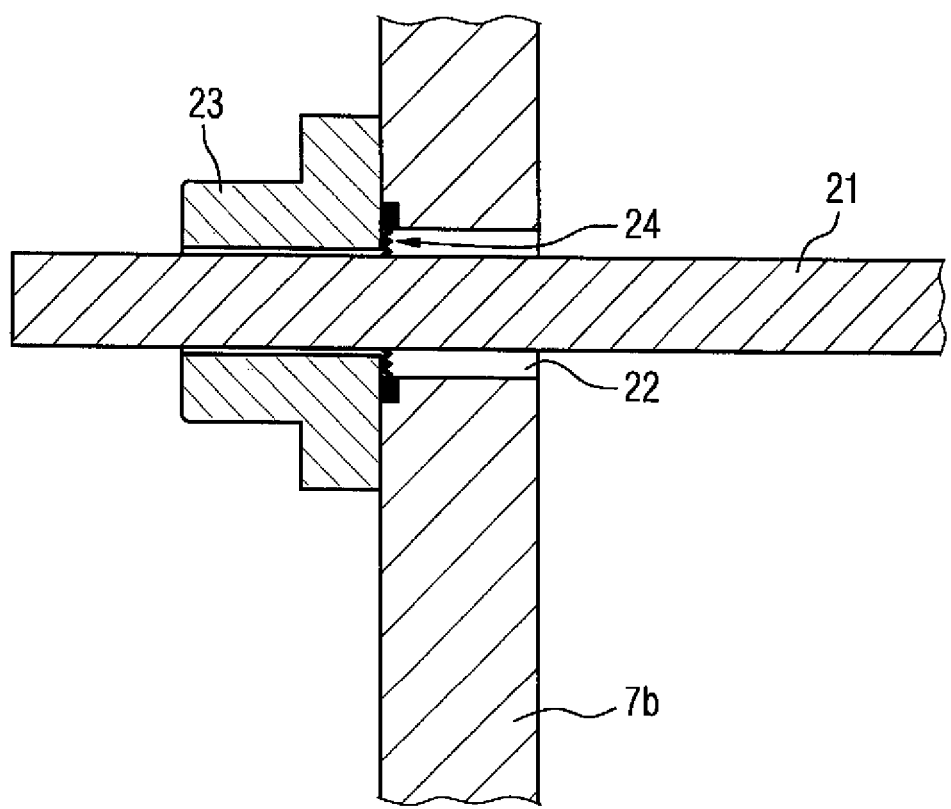
FIG. 4 shows an enlarged view of a feedthrough 22 having a corresponding connection element and a vacuum barrier 24 and a bearing device 23.

As illustrated in FIG. 3, and as an enlarged detail in FIG. 4, a bearing device 23 may be arranged on the outside of the housing side part 7b, in each case at a free end of a guide pin 21 or in a manner corresponding to the outer opening of the respective feedthrough 22. The guide pin 21 projects through the feedthrough 22 and the bearing device 23 and is readily visible, as seen from outside the rotor outer housing 7, by means of a free end. Arranged between the bearing device 23 and the housing side part 7b, completely surrounding the guide pin 21 over the feedthrough 22, a respective vacuum barrier 24 may be provided. The vacuum barrier 24 may be constructed as a CF flange with a membrane, and in conjunction with a respective guide pin 21 it may produce vacuum-tight closure of a feedthrough 22. As a result, a vacuum V may be present inside the rotor outer housing 7, and a change in position of the readily visible free ends of the guide pins 21 may be observed in the outside region of the rotor outer housing 7, in which no vacuum V prevails. In this case, the position of the free ends of the guide pins 21 changes as a function of the contraction or expansion of the winding former 9 inside the rotor outer housing 7 as it cools down to an operating temperature or heats up from an operating temperature of the superconducting electrical machine 2.

The bearing device may be lubricated with oils or lubricating grease or creams without any deterioration or effect on the vacuum V inside the rotor outer housing 7. The vacuum barrier 24 ensures that no oil or lubricating grease or cream reaches the inside of the rotor outer housing 7. The oil or lubricating grease or cream enables the guide pins 21 to slide in the bearing devices 23 with almost no friction or play. When the feedthrough has a slightly smaller diameter in the bearing device 23, by comparison with the feedthrough 22 in the rotor outer housing 7, with both feedthroughs arranged on a common center point axis with the longitudinal axis of the guide pin 21, there is no direct mechanical contact between the guide pin 21 and the housing side part 7b. As they slide without play, the guide pins 21 are only in direct mechanical contact with the lubricated bearing device 23 on the side of the free end of the guide pin 21. As a result, mechanical wear of the guide pins 21 and the bearing device 23 in the event of frequent movement of the guide pins 21 in relation to the feedthroughs 22 is avoided.

As an alternative to the exemplary embodiment described above, any other embodiments are possible, in particular in combination with the examples described under FIGS. 1 and 2. Thus, for example, the guide pin 21 and thus, conversely, the feedthroughs 22 may have the shapes of rectangular rods or bolts instead of a cylindrical shape. The guide pins 21 may also be made in a plurality of pieces. A tubular connection element 12 may be dispensed with if the guide pins 21 are attached to a winding former 9 directly or are attached to a winding former 9 by way of flanges 19. As an alternative to lubrication with oils or lubricating grease or creams, a Teflon coating may be used. Materials such as steel, copper or fiber-reinforced plastic material may be used for parts such as the guide pins 21, bearing device 23 and/or tubular connection element 12. However, other embodiments which are not illustrated in the figures and materials which are not mentioned in the description are also conceivable.

The invention claimed is:

1. A superconducting electrical machine, comprising:
an outer machine housing having a stator, and
a rotor supported in the outer machine housing by rotor shaft parts for rotation about a rotation axis, the rotor comprising a rotor outer housing and a cooled and thermally insulated winding support having first and second opposing axial ends and carrying at least one superconducting winding,
wherein a first connection device rigidly connecting the winding support to the rotor outer housing is arranged on the first axial end, and a second connection device is arranged on the second axial end between the winding support and the rotor outer housing, said second connection device compensating for changes in axial expansion in the winding support and comprising at least one axial connection element having a first end rigidly connected to the winding support and an opposite free end connected by way of a radially force-fitting and axially movable connection to at least one centering mounting element of the rotor outer housing,
wherein the centering mounting element comprises at least one feedthrough which extends through the rotor outer housing, with the free end of the at least one axial connection element of the second connection device being guided through the at least one feedthrough.

2. The superconducting electrical machine of claim 1, wherein the at least one axial connection element comprises an insulating tube constructed as a hollow cylinder, and a plurality of guide pins having two opposite ends, with one end of each guide pin being attached along a longitudinal side directly and mechanically to the insulating tube and the opposite end of each guide pin being a free end.

3. The superconducting electrical machine of claim 2, wherein the plurality of guide pins comprises at least three guide pins.

4. The superconducting electrical machine of claim 2, wherein the guide pins extend axially and the free end of each guide pin projects into a corresponding feedthrough so as to slide therein without play.

5. The superconducting electrical machine of claim 4, wherein each of the guide pins comprises a support ring disposed on the free end.

6. The superconducting electrical machine of claim 2, wherein the centering mounting element comprises at least one bearing device for the guide pins, through which the free end of a guide pin is guided.

7. The superconducting electrical machine of claim 6, wherein the at least one bearing device is attached to an external surface of the rotor outer housing in a region of a feedthrough.

8. The superconducting electrical machine of claim 6, wherein the bearing device has a vacuum barrier in a region of a feedthrough.

9. The superconducting electrical machine of claim 8, wherein the vacuum barrier is connected to a guide pin in vacuum-tight manner and covers the feedthrough in vacuum-tight manner.

10. The superconducting electrical machine of claim 8, wherein the vacuum barrier includes a CF flange having a membrane and being arranged between the bearing device and the rotor outer housing.

11. The superconducting electrical machine of claim 2, wherein the guide pins are constructed as bolts or rods.

12. The superconducting electrical machine of claim 11, wherein the bolts or rods have a cylindrical or cuboid shape.

13. The superconducting electrical machine of claim 1, comprising at least three feedthroughs that pass completely through the rotor outer housing, wherein the feedthroughs are arranged on a circumference having a center, with one of the rotor shaft parts being connected to the rotor outer housing at the center in a force-locking manner.

14. The superconducting electrical machine of claim 1, wherein the at least one axial connection element comprises at least one of steel, copper, Teflon or a fiber-reinforced plastic material.

15. The superconducting electrical machine of claim 1, wherein the at least one axial connection element is entirely made of steel, copper, Teflon or a fiber-reinforced plastic material.

16. The superconducting electrical machine of claim 1, wherein the at least one superconducting winding comprises conductors made of a metallic low-Tc superconducting material or a metal-oxide high-Tc superconducting material.

17. The superconducting electrical machine of claim 1, wherein the winding support is thermally insulated from the rotor outer housing by a vacuum space.

* * * * *